(12) United States Patent
Lipson et al.

(10) Patent No.: US 9,031,362 B2
(45) Date of Patent: May 12, 2015

(54) CONTROLLED INTER-MODE CROSS-TALK IN OPTICAL WAVEGUIDES

(71) Applicants: Cornell University, Ithaca, NY (US); Massachusetts Institute of Technology, Cambridge, MA (US)

(72) Inventors: Michal Lipson, Ithaca, NY (US); Lucas Heitzmann Gabrielli, Sao Paulo (BR); Steven G. Johnson, Arlington, MA (US); David Liu, Cambridge, MA (US)

(73) Assignees: Cornell University, Ithaca, NY (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/309,552

(22) Filed: Jun. 19, 2014

(65) Prior Publication Data

US 2014/0325827 A1    Nov. 6, 2014

Related U.S. Application Data

(63) Continuation of application No. PCT/US2012/070743, filed on Dec. 19, 2012.

(60) Provisional application No. 61/577,406, filed on Dec. 19, 2011.

(51) Int. Cl.
| | | |
|---|---|---|
| G02B 6/125 | (2006.01) | |
| G02B 6/10 | (2006.01) | |
| G02B 6/13 | (2006.01) | |
| G02B 6/14 | (2006.01) | |
| G02B 6/12 | (2006.01) | |

(52) U.S. Cl.
CPC ... *G02B 6/10* (2013.01); *G02B 6/13* (2013.01); *G02B 6/125* (2013.01); *G02B 6/14* (2013.01); *G02B 2006/12166* (2013.01)

(58) Field of Classification Search
None
See application file for complete search history.

(56) References Cited

U.S. PATENT DOCUMENTS

| | | | |
|---|---|---|---|
| 6,946,238 B2 * | 9/2005 | Zhang et al. | 430/321 |
| 7,215,860 B2 | 5/2007 | Engelberth et al. | |
| 7,848,602 B2 | 12/2010 | Kim et al. | |
| 8,363,987 B2 * | 1/2013 | Bagheri et al. | 385/3 |
| 8,463,097 B2 * | 6/2013 | Saida et al. | 385/129 |
| 2006/0204197 A1 * | 9/2006 | Miyadera et al. | 385/129 |

FOREIGN PATENT DOCUMENTS

| | | |
|---|---|---|
| JP | 08-184720 A | 7/1996 |
| JP | 10-332965 A | 12/1998 |
| WO | 02/33457 A2 | 4/2002 |

OTHER PUBLICATIONS

Chen et al. ("Efficient and Accurate Numerical Analysis of Multilayer Planar Optical Waveguides", SPIE vol. 3795, Jul. 1999).*
Guilloton et al. ("Optical Component Modelling and Circuit Simulation", hal-00392546, version 1-8 Jun. 2009).*
Melloni et al. ("Design of Curved Waveguides: The Matched Bend", Journal of Optical Society of America, vol. 20, No. 1, Jan. 2003).*

* cited by examiner

*Primary Examiner* — Michelle R Connelly
(74) *Attorney, Agent, or Firm* — Perkins Coie LLP

(57) ABSTRACT

Techniques and devices are disclosed to provide controlled inter-mode cross-talk in multimode optical waveguides. The structure of a bent multimode optical waveguide can be designed or configured in a way that either substantially minimizes inter-mode cross talk or achieves a desired inter-mode cross-talk. Specific examples based on the disclosed waveguide designs are provided for semiconductor integrated waveguide devices.

14 Claims, 13 Drawing Sheets

CONTROLLED INTER-MODE CROSS-TALK IN OPTICAL WAVEGUIDES

PRIORITY CLAIM AND RELATED PATENT APPLICATIONS

This patent document is a continuation of International Patent Application No. PCT/US2012/070743 entitled "CONTROLLED INTER-MODE CROSS-TALK IN OPTICAL WAVEGUIDES," filed on Dec. 19, 2012 and published as PCT Publication No. WO 2013/096521 on Jun. 27, 2013. The above International Patent Application No. PCT/US2012/070743 further claims the priority of U.S. provisional application No. 61/577,406 entitled "INTEGRATED MULTIMODE PHOTONICS WITH CONTROLLED INTER-MODE CROSS-TALK," filed on Dec. 19, 2011.

The entire disclosures of the above two patent applications are incorporated by reference as part of this document.

STATEMENT REGARDING FEDERALLY SPONSORED RESEARCH OR DEVELOPMENT

This invention was made with government support from U.S. Air Force Office of Scientific Research under project ID No. FA9550-09-1-0704. The government has certain rights in this invention.

BACKGROUND

This patent document relates to optical waveguides and devices based on optical waveguides.

Optical waveguides can be configured as either single-mode waveguides or multimode waveguides. A single-mode waveguide is structured to support and guide light in only one mode of propagation at a given optical frequency. In order to increase the data transmission capacity of such systems, multiplexing schemes are commonly used, such as Wavelength Division Multiplexing (WDM) where different signals are transmitted at different frequencies. When the optical power is below a certain power level, the waveguides and other structures are optically linear devices, the signals at different frequencies propagate independently with minimal cross talk.

Multi-mode waveguides support light in a given frequency in different optical modes of propagation. Different optical modes in such a multimode waveguide can have different optical properties. These modes are primarily defined at a given cross-section of the guiding structures and, as long as this cross-section is constant or changes slowly along the propagation direction, there is no conversion of light from one mode to another. In a simple straight multimode optical waveguide that supports two or more optical modes, two different optical modes usually exist independently and do not mix with each other. Bending of a multimode optical waveguide tends to cause mixing of different optical modes or inter-mode cross-talk.

SUMMARY

Techniques and devices are disclosed to provide controlled inter-mode cross-talk in multimode optical waveguides. The structure of a bend multimode optical waveguide can be designed or configured in a way that either substantially minimizes inter-mode cross talk or achieves a desired inter-mode cross-talk. Specific examples based on the disclosed waveguide designs are provided for semiconductor integrated waveguide devices.

In one aspect, a method for designing a multimode waveguide device is provided to include providing an initial virtual multimode waveguide structure that supports different optical modes and is structured to have desired optical properties and behavior in guiding the different optical modes; providing a transformation function representing optical properties of a target multimode waveguide structure that is different in structure from the initial virtual multimode waveguide structure and that is to be designed to substantially retain the desired optical properties and behavior of the initial virtual multimode waveguide in guiding the different optical modes in the target multimode waveguide structure; adjusting a geometry, a dimension or an effective refractive index of the target multimode waveguide structure, thus changing the transformation function, to modify the target multimode waveguide structure while substantially retaining the desired optical properties and behavior of the initial virtual multimode waveguide in guiding the different optical modes in the target multimode waveguide structure; and continuing to adjust a geometry, a dimension or an effective refractive index of the target multimode waveguide structure to optimize the transformation function to achieve an optimized target multimode waveguide structure which has a desired structure different from the initial virtual multimode waveguide structure and which substantially retains the desired optical properties and behavior of the initial virtual multimode waveguide in guiding the different optical modes in the optimized target multimode waveguide structure.

In practicing the above method, various implementations may be possible. In one implementation, the initial virtual multimode waveguide structure represents a virtual straight multimode waveguide structure in which the different optical modes are independent of one another with a reduced cross-talk between the different optical modes; and the optimized target multimode waveguide structure is a bend multimode waveguide structure that has a spatially varying bend profile and a spatially varying effective index of refraction to maintain the different optical modes to be independent of one another with a reduced cross-talk between the different optical modes. In another implementation, the initial virtual multimode waveguide structure causes the different optical modes to mix to produce a desired amount of cross-talk between the different optical modes; and the optimized target multimode waveguide structure is a bend multimode waveguide structure that has a spatially varying bend profile and a spatially varying effective index of refraction to maintain the desired amount of cross-talk between the different optical modes of the initial virtual multimode waveguide structure. In another implementation, the optimized target multimode waveguide structure can be configured to cause light in the different optical modes to maintain a phase-matching relation. In another implementation, the optimized target multimode waveguide structure can be configured to include a narrow waist section at which the light is spatially squeezed. In another implementation, the optimized target multimode waveguide structure can be configured to include an expanded section at which the light is spatially expanded. In another implementation, the optimized target multimode waveguide structure can be configured as an optical modulator. In yet another implementation, the optimized target multimode waveguide structure can be configured as an optical interferometer.

In one aspect, a device is provided to include a substrate and an optical waveguide formed on the substrate that supports different optical modes and includes an input waveguide section that receive light in the different optical modes, a bend waveguide section connected to the input waveguide section to receive and carry the light, and an output waveguide section connected to the bend waveguide section to output the light received from the bent waveguide section. The bend waveguide section is structured to include a layered structure formed on the substrate and a spatially varying refractive index that in combination cause light in the different optical modes received from the input waveguide section to remain independent of one another with a reduced cross-talk between the different optical modes.

In another aspect, a device is provided to include a substrate and an optical waveguide formed on the substrate that supports different optical modes and includes an input waveguide section that receive light in the different optical modes, a bend waveguide section connected to the input waveguide section to receive and carry the light, and an output waveguide section connected to the bend waveguide section to output the light received from the bent waveguide section. The bend waveguide section is structured to include a layered structure formed on the substrate and a spatially varying refractive index that in combination control light coupling between the different optical modes received from the input waveguide section to achieve a desired cross-talk between the different optical modes.

In another aspect, a method for designing an optical propagation medium is provided to include determining a light propagation characteristic of a virtual propagation medium; and recreating the light propagation characteristic in a real, non-homogeneous propagation.

In yet another aspect, a method is provided for designing an optical waveguide that supports different optical modes to have a controlled coupling between optical modes. This method includes providing an optical waveguide to include an input waveguide section that receive light in the different optical modes, a bend waveguide section connected to the input waveguide section to receive and carry the light, and an output waveguide section connected to the bend waveguide section to output the light received from the bent waveguide section; providing a first mode transformation function representing impact to the optical modes by the input waveguide section, a second mode transformation function representing impact to the optical modes by the bend waveguide section and a third mode transformation function representing impact to the optical modes by the output waveguide section; and adjusting geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section to produce a spatially varying structure and a spatially varying refractive index in the bend waveguide section to produce controlled coupling of light in the different optical modes.

These and other aspects and their implementations are described in greater detail in the attached drawing, the description and the claims.

DETAILED DESCRIPTION

Figure 1A:
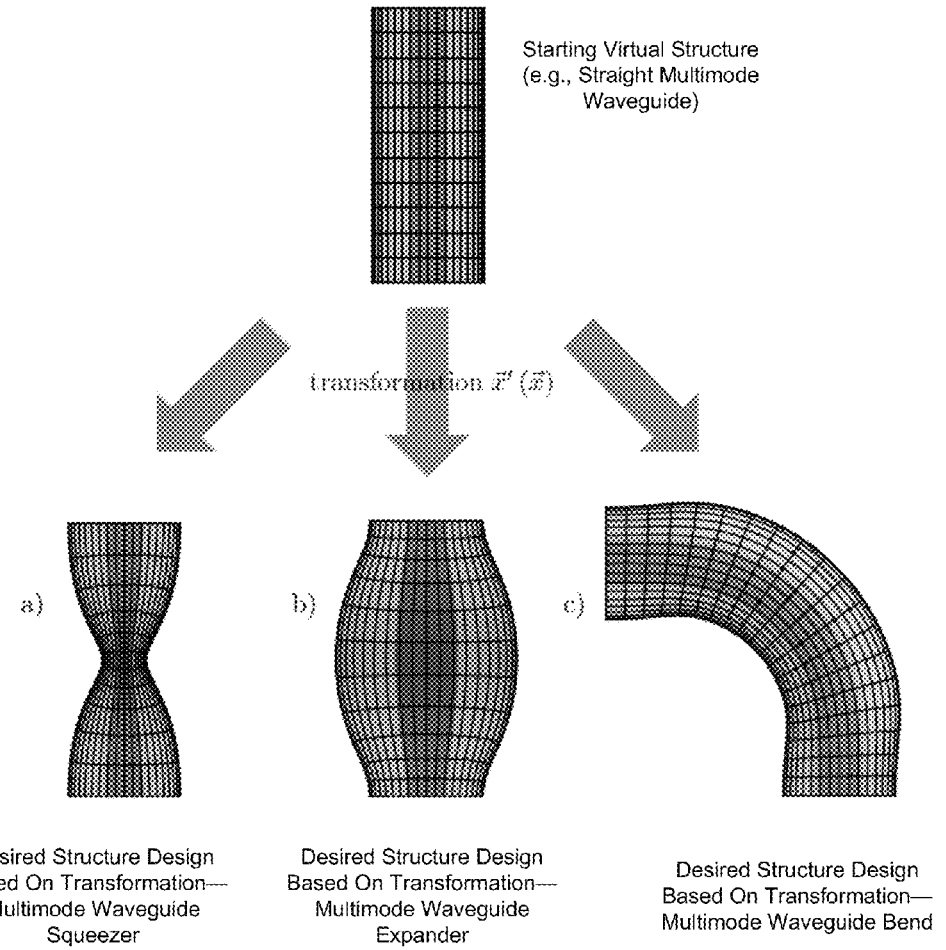
FIG. 1A shows examples of desired designs of multimode waveguide structures based on transformation of an initial virtual multimode waveguide structure (e.g., a straight multimode waveguide section).

The inter-mode cross-talk in a multimode optical waveguide may have different effects in different devices or applications. The independence of different optical modes in a multimode waveguide may be used for certain applications. For example, such independent optical modes may be used in optical communications to carry information of different communication channels or signals, respectively, one mode per channel. This can be used to further expand the bandwidth of optical communications systems based on optical wavelength division multiplexing (WDM) where different optical modes at the same WDM wavelength can be used to carry different channels. As such, a platform for optical communications on chip can be provided via multi-mode waveguides with reduced cross-talk between modes. Multi-mode waveguides can transmit information multiplexed in different propagation modes at the same time and at the same frequency (or wavelength). During straight line propagation, information travels separately in each of these modes, which can be used as independent channels for communication. However, any routing of this information that deviates from a straight line will, without further design, may cause information from different channels to mix, producing undesired inter-mode cross-talk, and possibly destroying the information. A design method based on Transformation Optics is provided to create multi-mode optical interconnects on chip with reduced (ideally zero) cross-talk. In one aspect, the Transformation Optics can be used to design the structure (e.g., geometry, dimension and refractive index profile) and bending of a multi-mode waveguide that can be fabricated to minimize the inter-mode cross talk and the residual anisotropy of the medium. In other applications, a controlled mixing of different modes in a multi-mode optical waveguide may be desired. The techniques and designs based on the Transformation Optics can be used to achieve such controlled mixing.

The design techniques based on Transformation Optics use a coordinate transform x'(x) that warps light in a desired way, e.g. mapping a straight waveguide to a bend waveguide, or mapping an object to a point for cloaking applications. The material electromagnetic properties ($\in$, µ) are also transformed by a Jacobian matrix for the coordinate transformation given by $$\mathcal{J}_{i,j} = dx'_i/dx_i$$

This transforms all solutions of Maxwell's equations in the same way, and is therefore particularly attractive for designing multimode optical devices such as multimode bends with no intermodal scattering or mode squeezers, splitters, and couplers.

Various other transformations x'(x) yield highly anisotropic material electromagnetic properties ($\in$, µ). Materials such as metamaterial structures may be engineered to achieve such highly anisotropic material electromagnetic properties ($\in$, µ). In the optical region such as the infrared regime, it is far easier and economical to fabricate isotropic nonmagnetic materials within given bounds [$\in$min, $\in$max], for example by grayscale lithography techniques. A slowly varying transformation can be approximated by a nonmagnetic material and can be optimized to achieve a minimal peak anisotropy with $\in$ is within the allowable range of [$\in$ min; $\in$ max] while achieving a desired transformed structure, such as a bend waveguide section.

Maxwell's equations for an electric field E in a source-less and current-less medium having material electromagnetic properties ($\in$, µ) can be expressed as $$\nabla \times \mu^{-1} \nabla \times E = \varepsilon \frac{\partial^2 E}{\partial t^2}$$

The form of Maxwell's equations is coordinate invariant when transformed by the above Jacobian matrix for the coordinate transformation:

$$\nabla' = (\mathcal{J}^T)^{-1} \nabla$$
$$E' = (\mathcal{J}^T)^{-1} E$$
$$\mu' = \frac{\mathcal{J}\mu\mathcal{J}^T}{\det \mathcal{J}}$$
$$\varepsilon' = \frac{\mathcal{J}\varepsilon\mathcal{J}^T}{\det \mathcal{J}}$$

The designs of multimode waveguides in the present technology use the above coordinate transformation to design various multimode waveguide structures based on transformation of a straight multimode waveguide and based on use of nearly isotropic materials.

FIG. 1A shows three examples of multimode waveguide structures that can be designed based on the above coordinate transformation from an initial virtual structure: (a) a multimode waveguide guide squeezer with a narrow and tapered waist structure, (b) a multimode waveguide expander with a bulging waist structure, and (c) a multimode bend waveguide. In this example, the initial virtual structure is a straight multimode waveguide section As an example, the following describes an example of a design method for multi-mode optical devices with minimal inter-mode cross talk (theoretically zero), or more generally, controlled inter-mode cross talk, in devices where inter-mode conversion is wanted, and implementation of such devices. The coordinate transformation approach allows to freely mold the flow of light in a virtual space and re-create such space via non-homogeneous media, i.e., media where the refractive index value is not constant. The transformation between the virtual space and the real space via a varying refractive index medium is optimized to produce a medium with refractive index in a range constrained by the material system and fabrication technology that will be used in the fabrication process. The optimization also minimizes or constrains the resulting anisotropy of the medium according to the fabrication technology and material system used.

The approach can decouple the inter-mode cross talk from the flow of light. Light propagates in such structures as if it were in the virtual space. For example, in applications where inter-modal conversion is undesirable, the starting point of the transformation is the straight multimode waveguide as shown in FIG. 1A in a virtual space with a constant cross-section guiding structure. Under transformation optics, no matter how we bend or transform the space, the resulting structure will maintain no inter-mode conversion. Alternatively, we can design the initial virtual structure to have a waveguide with a controlled amount of inter-mode conversion for certain applications and then apply a suitable transformation to achieve a desired structure which retains the designed mode conversion in the initial virtual structure.

Furthermore, this design method also decouples in a similar manner the phase relationship of the different propagating modes from the flow of light (bending/warping of the waveguide). This is important for phase-sensitive devices, such as multi-mode interferometers, non-linear frequency conversion, Mach-Zehnder interferometers, and standing- or traveling-wave resonators.

Figure 1B:
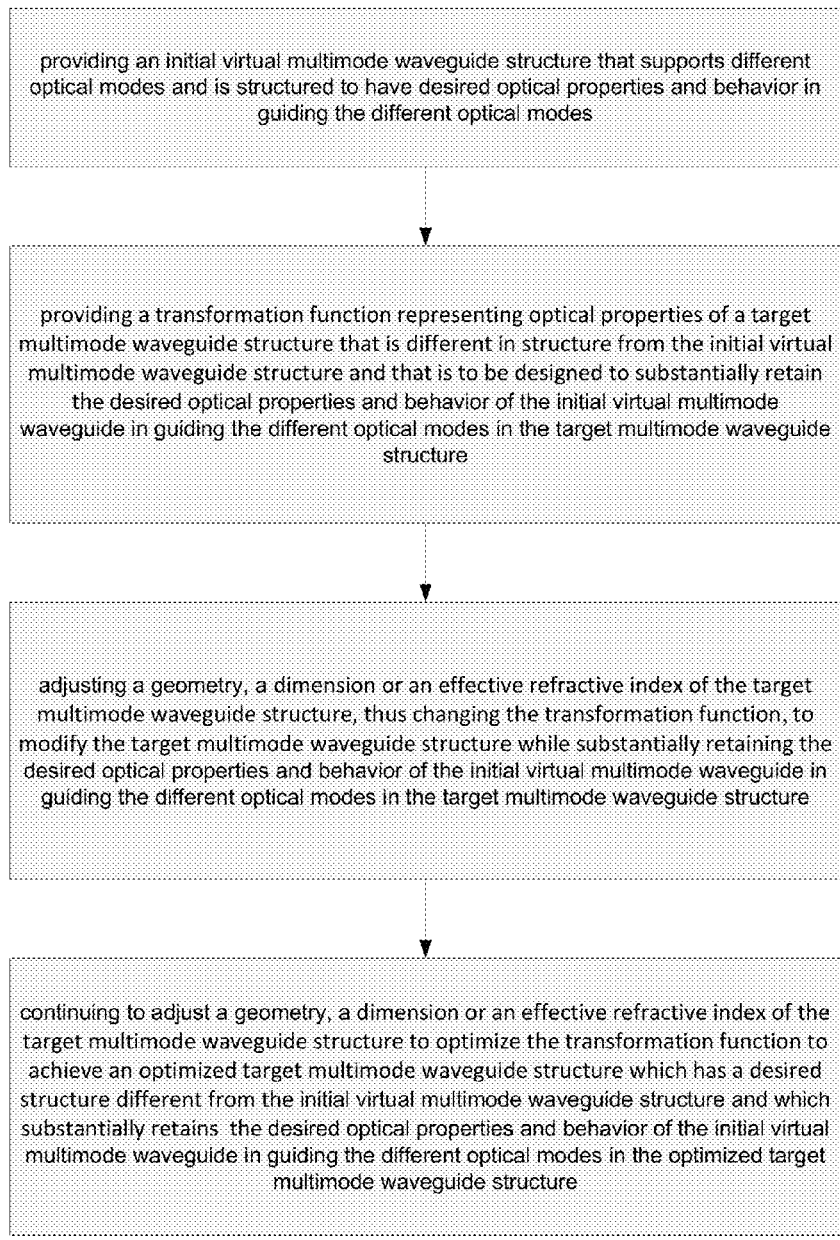
FIG. 1B shows an example of a design process for designing a multimode waveguide structure based on transformation optics.

FIG. 1B shows an example of a design process for designing a multimode waveguide structure based on transformation optics. This process for designing a multimode waveguide device includes providing an initial virtual multimode waveguide structure that supports different optical modes and is structured to have desired optical properties and behavior in guiding the different optical modes. A transformation function is provided to represent optical properties of a target multimode waveguide structure that is different in structure from the initial virtual multimode waveguide structure and that is to be designed to substantially retain the desired optical properties and behavior of the initial virtual multimode waveguide in guiding the different optical modes in the target multimode waveguide structure. Next in this process, a geometry, a dimension or an effective refractive index of the target multimode waveguide structure is adjusted. This adjustment changes the transformation function and modifies the target multimode waveguide structure while substantially retaining the desired optical properties and behavior of the initial virtual multimode waveguide in guiding the different optical modes in the target multimode waveguide structure. Subsequently, iterations are performed to continue to adjust a geometry, a dimension or an effective refractive index of the target multimode waveguide structure to optimize the transformation function to achieve an optimized target multimode waveguide structure. This optimized structure has a desired structure different from the initial virtual multimode waveguide structure and substantially retains the desired optical properties and behavior of the initial virtual multimode waveguide in guiding the different optical modes in the optimized target multimode waveguide structure.

In practicing the above method, various implementations may possible. In one implementation, the initial virtual multimode waveguide structure represents a virtual straight multimode waveguide structure in which the different optical modes are independent of one another with a reduced cross-talk between the different optical modes; and the optimized target multimode waveguide structure is a bend multimode waveguide structure that has a spatially varying bend profile and a spatially varying effective index of refraction to maintain the different optical modes to be independent of one another with a reduced cross-talk between the different optical modes. In another implementation, the initial virtual multimode waveguide structure causes the different optical modes to mix to produce a desired amount of cross-talk between the different optical modes; and the optimized target multimode waveguide structure is a bend multimode waveguide structure that has a spatially varying bend profile and a spatially varying effective index of refraction to maintain the desired amount of cross-talk between the different optical modes of the initial virtual multimode waveguide structure.

We have demonstrated our design method in simulation for a 90° multi-mode waveguide bend. The bend interfaces with a 311 m wide waveguide in a conventional silicon platform. Our transformation ensures that both inter-mode cross talk and reflections at the interfaces between the straight waveguides and the bend are minimized.

Figure 2:
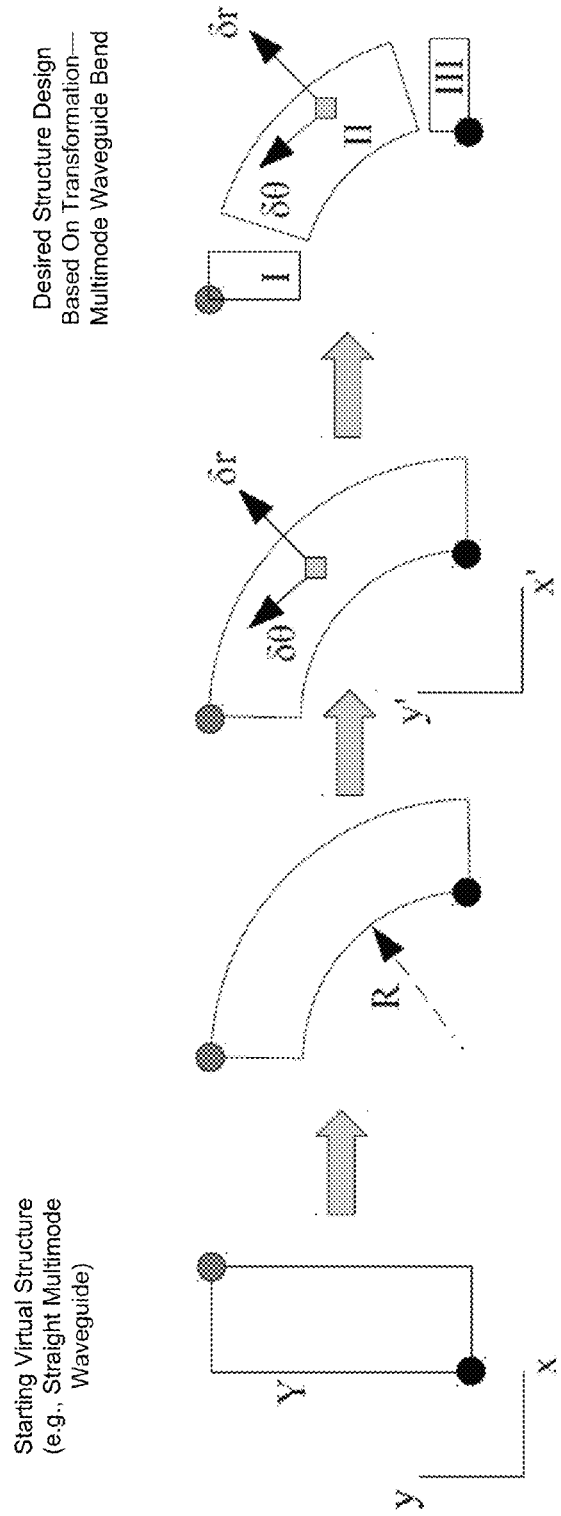
FIG. 2 shows an example of a three-step bend transformation for forming a desired bend multimode waveguide from a virtual straight multimode waveguide.

FIG. 2 shows an example of a three-step bend transformation for forming a desired bend multimode waveguide from a virtual straight multimode waveguide. First, the straight region is mapped to a circular bend. Next, the radius and polar angle for every point are both perturbed and the index of refraction is recalculated. This process is repeated at each optimization step until the structure converges to one with minimum max anisotropy.

As shown in FIG. 2, the final waveguide structure design includes 3 sections with input and output sections and the center bend section. The three sections can be represented by 3 transformation functions, respectively: a first mode transformation function representing impact to the optical modes by the input waveguide section, a second mode transformation function representing impact to the optical modes by the bend waveguide section and a third mode transformation function representing impact to the optical modes by the output waveguide section. Next; geometries, dimensions and refractive indices associated with the input waveguide section, the bend waveguide section and the output waveguide section are adjusted or iterated to optimize the first, second and third mode transformation functions and boundary conditions at boundaries of the input waveguide section, the bend waveguide section and the output waveguide section to produce a spatially varying structure and a spatially varying refractive index in the bend waveguide section to produce controlled coupling of light in the different optical modes. This controlled coupling of light in the different optical modes can be set to be zero or minimized if no inter-mode coupling is desired or can be set to be some desired value.

Figure 3:
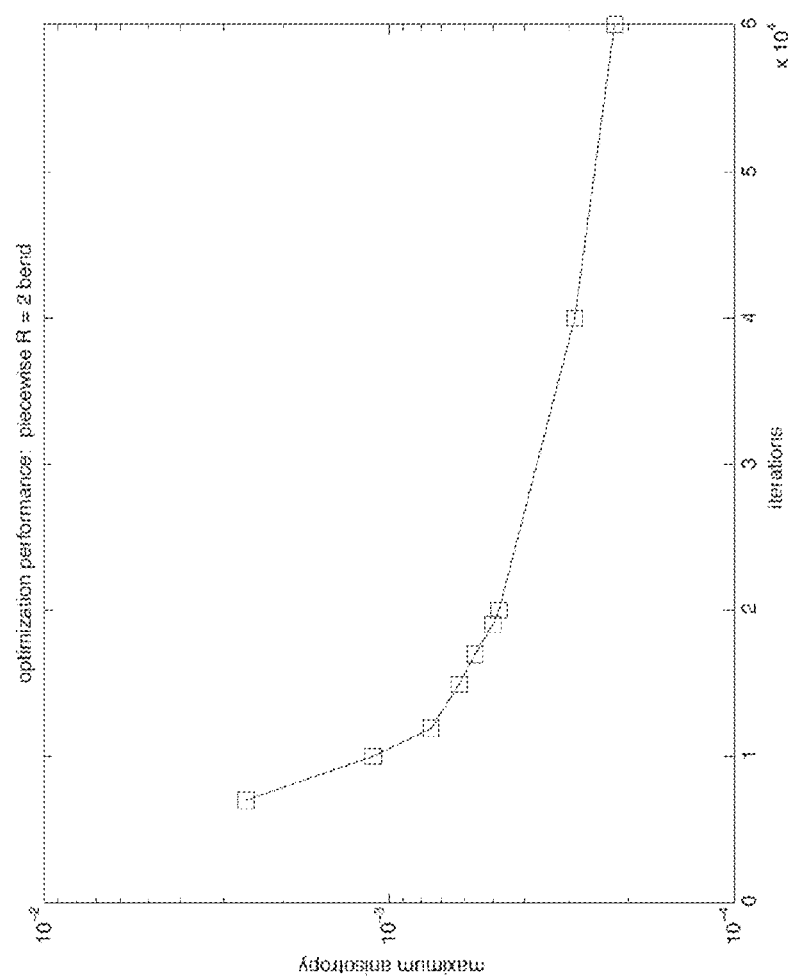
FIG. 3 shows an example of the residual anisotropy as a function of the number of optimization iterations for the bend transformation in FIG. 2.

As described above, a slowly varying transformation can be approximated by a nonmagnetic material and can be optimized to achieve a minimal peak anisotropy with $\in$ is within the allowable range of $[\in$ min; $\in$ max] while achieving a desired transformed structure. This use of a material with low anisotropic material is advantageous since many dielectric materials used for waveguide structures in integrated photonic devices are isotropic. Therefore, for many practice designs, the design process is implemented to achieve a final structure with reduced anisotropy. FIG. 3 shows an example of the residual anisotropy as a function of the number of optimization iterations for the bend transformation in FIG. 2.

Figure 4:
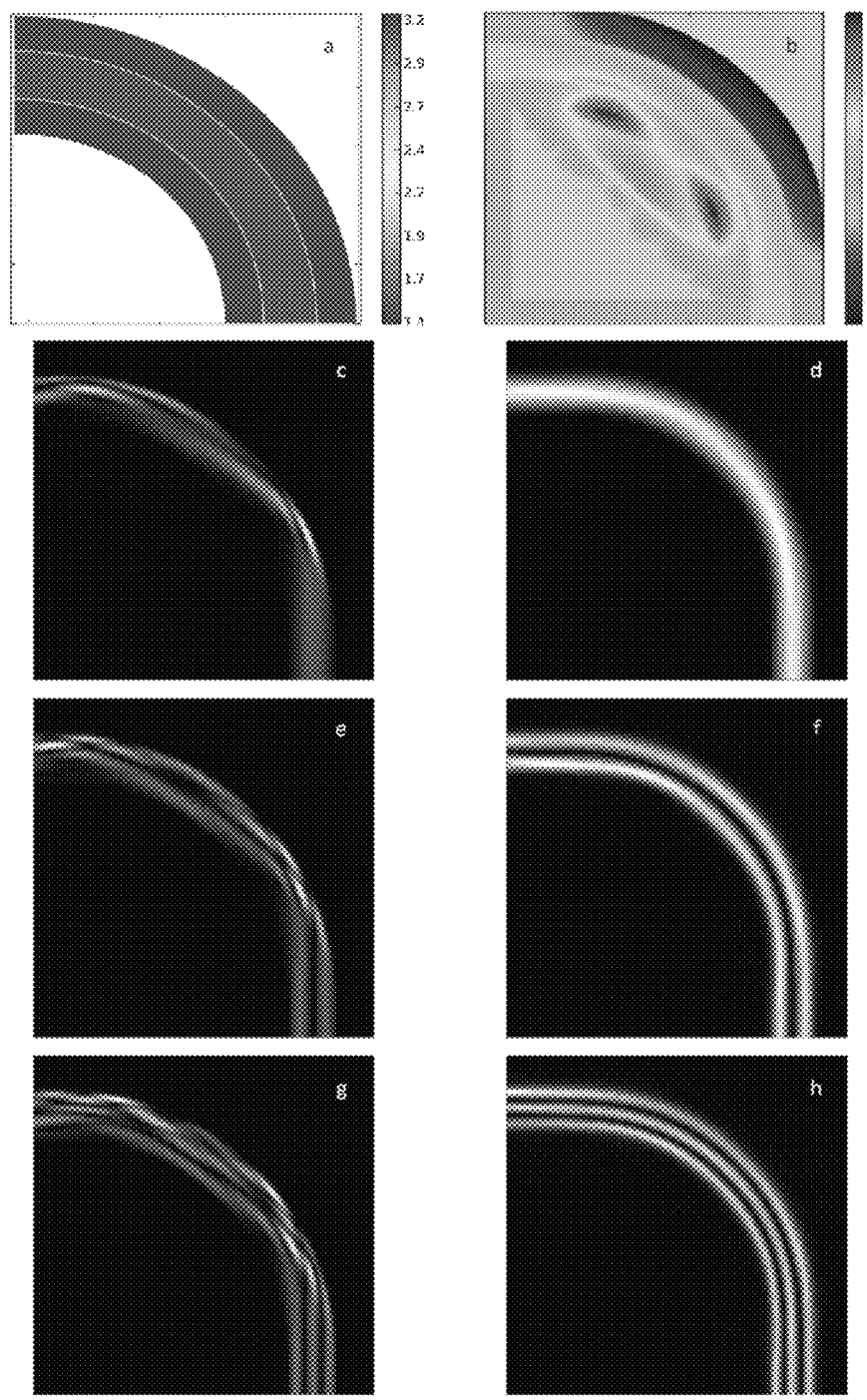
FIG. 4 shows examples of simulated images of 90° multimode waveguide bends: refractive index map for a conventional bend (a) and our design (b), along with the power distribution for excitation of the first (c,d), second (e, f) and third {g,h} propagation modes at the input waveguides at bottom edges. The conventional bend in (a) clearly introduces mode conversion in all three modes (c, e, g), while the optimized bend design allows the modes to propagate unmodified (d, f, h).

FIG. 4 shows the refractive index map of the designed bend as well as the power distribution for signals travelling through the bend in the first 3 propagation modes in comparison to a constant refractive index 90° bend (conventionally used in single-mode waveguides). Specifically, FIG. 4 shows examples of simulated images of 90° multi-mode waveguide bends: refractive index map for a conventional bend (a) and our design (b), along with the power distribution for excitation of the first (c,d), second (e, f) and third {g,h) propagation modes at the input waveguides at bottom edges. The conventional bend in (a) clearly introduces mode conversion in all three modes (c, e, g), while the optimized bend design allows the modes to propagate unmodified (d, f, h).

The following sections provide some design details for a 90° bend with minimized inter-mode cross talk. The effects of coordinate transformations on Maxwell's Equations in 2D, with Jacobian J, can be absorbed into the index of refraction as $$n' = \sqrt{\mu'\varepsilon'} = n\sqrt{\frac{JJ^T}{(\det J)^2}}$$

The anisotropy of the material is a measure of how different the eigenvalues of this tensor are. If the eigenvalues are equal, then it is zero. It is given by $$M(x, y) = \left(\frac{\lambda_1}{\lambda_2} + \frac{\lambda_2}{\lambda_1}\right)^2 - 4 = \left(\frac{trJJ^T}{\det J}\right)^2 - 4$$

For fabrication in a silicon platform, as is the case in this example, this quantity is to be as close to zero as possible. A simple 90° bend transformation has the Jacobian $$J = \begin{bmatrix} \frac{\partial x'}{\partial x} & \frac{\partial x'}{\partial y} \\ \frac{\partial y'}{\partial x} & \frac{\partial y'}{\partial y} \end{bmatrix} = \begin{bmatrix} \cos\theta & -\frac{\pi(R+x)}{2Y}\sin\theta \\ \sin\theta & \frac{\pi(R+x)}{2Y}\cos\theta \end{bmatrix}$$

where θ is proportional to γ. Customizable parameters include Y, the length of the original straight waveguide that we are bending, and R, the inner radius. There are two modifications that need to be made for acceptable performance of the multi-mode bend. First this transformation gives unacceptably large anisotropy. To fix this, we allowed perturbations of the radius and angle from the simple bend in the form of r+δr and θ+δθ. The perturbations δr (x, y) and δθ (x, y) were optimized at every point in the grid to minimize the anisotropy.

The end facets of the bend must be coupled into a straight waveguide with a symmetric index profile. This profile is the same as the index before the transformation. So, the new index n' should be equal to the old index at the end facets where θ=0,π/2. The simple bend Jacobian does not satisfy this condition, and the optimization algorithm cannot impose this constraint without suffering in performance. To impose this constraint, we split the bend into three regions, as shown in FIG. 2. Regions I and III are simple identity transformations, and have n'=n. Region II is the optimized bend. A Gaussian function $H^{(\theta)}$ was used to smoothly transition between the three transformations in the three regions.

The non-homogeneous medium generated from our optimized transformation can be implemented in a variety of ways:

Controlled deposition/formation of silicon oxi-nitrides in various compositions to replicate the required refractive index variation Controlled deposition/formation of doped glass, where the doping concentration is varied to produce the required index of refraction variation in the medium.

Figure 5A:
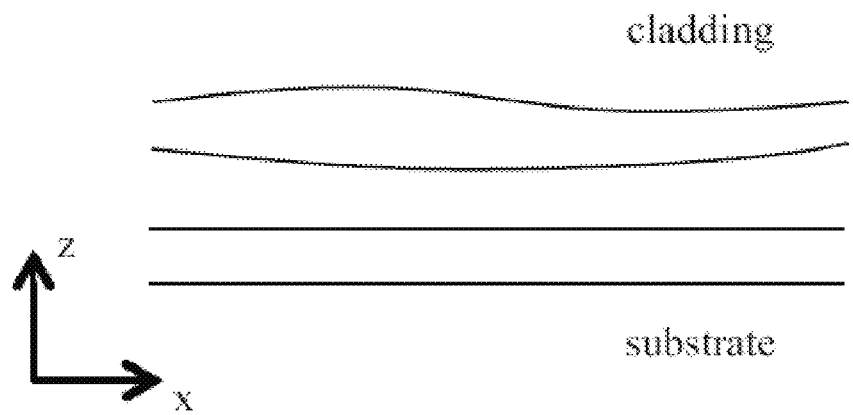
FIG. 5 shows examples of implementation options of a layered waveguide structure to produce a desired spatially varying effective refractive index profile: varying the thickness (z direction) (a), or patterning sub wavelength features with varying filling factor (b) on one or more layers of the guiding structure produces a controllable varying effective refractive index for light in the propagation direction (x-y plane).

Through variation of the effective refractive index experienced by light in the propagation plane due to confinement in the orthogonal direction by a layered structure. The variation of the effective refractive index can be accomplished by:

Varying the thickness of one or more layers of the guiding structure (see FIG. 5A) by direct patterning with a focused ion beam, gray-scale lithography (either photo- or electron beam lithography) of a resist layer and later transfer of the resist patter to the guiding structure via etching, controlled local oxidation with a patterned oxidation mask (created by any of the previous methods), variable thickness material coating/deposition assisted by an engineered electric potential, temperature or pressure/stress.

Figure 5B:
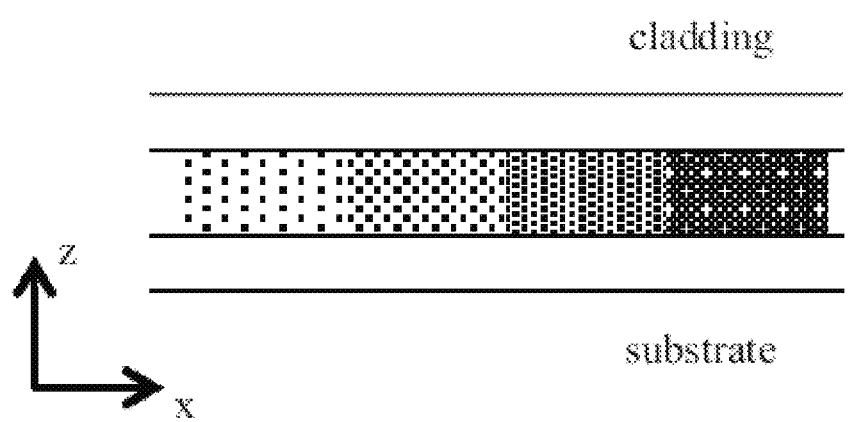

Patterning (via conventional lithographic processes) sub-wavelength features, like nano-holes, pillars, grooves, or lines, whose filling fraction controls the local effective refractive index of the material (see FIG. 5B).

The implementation based on the effective refractive index can be done in the conventional CMOS platform (Si, $SiO_2$, SiN, Ge), III-V compounds (such as GaAs), chalcogenide glasses, $LiNbO3$, or polymer.

The designed 90° bend is only one of the possible applications of our design method and implementation. Other variations of multimode devices include:

Multi-mode waveguide bends of arbitrary angle where the medium anisotropy is below 0.01.

Multi-mode spirals, S-curves, zigzags, and space-filling curves to attain long optical path lengths for a given device footprint, e.g. for true time delays, modal dispersion compensation, etc., with anisotropy below 0.01. In the context of non-linear devices, our method can be used to design structures that preserve phase-matching through curved paths for processes that couple distinct modes with a certain phase relationship requirement, such as sum frequency generation, difference frequency generation, second harmonic generation, third harmonic generation, and four-wave mixing.

Multi-mode squeezers and expanders, where the multi-mode waveguide has its width decreased or increased with anisotropy below 0.01.

Mode-selective modulator based on the multi-mode expander, where only desired mode(s) in the multi-mode waveguide are modulated (electrically, via electro-optic effects on the material system, or optically, via non-linear effects such as two-photon absorption and free-carrier generation), while the others pass by the device with small perturbation.

Multi-mode modulator based on the multi-mode squeezer, where all modes are modulated simultaneously (electrically, via electro-optic effects on the material system, or optically, via non-linear effects such as two-photon absorption and free-carrier generation) and the modes are squeezed to a smaller area in order to improve the efficiency of the modulator relative to the same modulator being applied to the original waveguide without the squeezed cross-section region.

Multi-mode splitter, where all modes are split in two or more channels with inter-mode crosstalk below 0.15.

Multi-mode ring resonators (circular or not) based on bent multi-mode waveguides where the mode dispersion is directly related to one in the multi-mode waveguide such that a Mach-Zenhder-type coupling scheme can be used for more than one mode simultaneously, i.e., a coupling scheme where there are two or more coupling regions between the ring and the waveguide it couples to.

Multi-mode Mach-Zehnder interferometers, standing-wave resonators, and multi-mode interferometers based on the previous multi-mode bends, curves, squeezers/expanders, or splitter.

Waveguide crossings through 3-dimensional transformations, where one waveguide bends over the other.

Waveguide array bends, curves, squeezers/expanders, and ring resonators, where the phase relationship between super-modes of the array is preserved in analogous way as described before for the modes of a multimode waveguide, and the crosstalk between super-modes is also minimized.

Bends, curves, squeezers/expanders, rings resonators, and Mach-Zehnder interferometers based on periodic or grated waveguides, where the dispersion of the device directly matches the periodic or grated waveguide it is based on over a frequency window.

Control the flow of light through bends, curves, squeezers/expanders, etc. for 2-dimensional non-guided optics, such as beams propagating in a material slab, where the effective refractive index of the system presents no discontinuity in the propagation plane.

Control the flow of light through bends, curves, squeezers/expanders, etc. for beams propagating in a photonic crystal.

Control the flow of super collimated (or other anomalous diffraction) beams through bends, curves, squeezers/expanders, etc. without otherwise altering their propagation or diffraction characteristics in free-space or confined to a material slab.

We now provide some details on the coordinate transformation in the example of designing the 90-degree bend by turning a straight region of height Y and width 1 into a bend angle of θmax and an inner radius R. A 90 degree bend would have $\theta_{max}=\pi/2$. The transformation is $$x'_{bend}(x, y) = (R + x + \delta r(x, y))\cos\left(\theta_{max}\frac{y}{Y} + \delta\theta(x, y)\right)$$

$$y'_{bend}(x, y) = (R + x + \delta r(x, y))\sin\left(\theta_{max}\frac{y}{Y} + \delta\theta(x, y)\right)$$

where deformations in radius and angle are optimized to minimize the anisotropy.

To implement the piecewise bend, we use the piecewise function $H^{(y)}$. There are three total functions that dominate in each of their respective regions, so that the total transformation is a sum of the three contributions where I and III represents the two end regions and II represents the center bend region.

$$x'(x,y)=H_1(y)x'_I(x,y)+H_2(y)x'_{bend}(x,y)+H_3(y)x'_{III}(x,y)$$

$$y'(x,y)=H_1(y)x'_I(x,y)+H_2(y)y'_{bend}(x,y)+H_3(y)y'_{III}(x,y)$$

The input region is essentially just an identity transformation. We define the origin to be the center of the bend, so we have $$x'_I(x,y)=x+R$$

$$y'_I(x,y)=y$$

The Jacobian for this is just the 2×2 identity: $\mathcal{J}_I=1$.
The output region III is rotated by $\theta_{max}$:

$$x'_{III}(x,y)=(R+x)\cos(\theta_{max})+(Y-y)\sin(\theta_{max})$$

$$y'_{III}(x,y)=(R+x)\sin(\theta_{max})-(Y-y)\cos(\theta_{max})$$

The Jacobian is $$\mathcal{J}_{III} = \begin{pmatrix} \cos(\theta_{max}) & -\sin(\theta_{max}) \\ \sin(\theta_{max}) & \cos(\theta_{max}) \end{pmatrix}$$

The Jacobian $\mathcal{J}(x,y)$ of the entire piecewise transformation can be derived. Note that taking x can be done in the three regions separately, but taking y derivatives leads to factors of H'=dH/dy as well. The full Jacobian (used for computing anisotropy and transformed index) is $$\mathcal{J}(x, y) =$$

$$H_1 J_I + H_2 J_{II} + H_3 J_{III} + H'_1\begin{pmatrix} 0 & x_I \\ 0 & y_I \end{pmatrix} + H'_2\begin{pmatrix} 0 & x_{II} \\ 0 & y_{II} \end{pmatrix} + H'_3\begin{pmatrix} 0 & x_{III} \\ 0 & y_{III} \end{pmatrix}$$

To smoothly transition between the three regions, we use a Gaussian "taper" function that continuously modulates the strength of each of the three transformations. The Gaussian function is:

$$H(y) = \exp\left(\frac{-y^2}{\xi^2}\right)$$

where $\xi<Y$ is the skin depth of the taper. This has the special property that H=1 at y=0 and it is almost zero at y=Y. Also, the derivative vanishes exactly at y=0, and is very small at y=Y. For each of the three regions, we define a different H function:

$$H_1=H(y)$$

$$H_2=H(Y-y)$$

$$H_3=1-H_1-H_2$$

The deformation functions δr(x,y) and δθ(x,y) are not stored directly in the code. We look only at reasonably slowly varying functions for at least two reasons: first, we expect fast varying functions to have higher anisotropy (because the Jacobian is proportional to the derivative and the term that depends on the anisotropy is proportional to the Jacobian squared). Second, we assume the untransformed permittivity $\mu=1$ and that the new permittivity tensor $\mu'=\mathcal{J}\mathcal{J}^T/\det\mathcal{J}\mathcal{J}$ is slowly varying so that we can commute it with the curl in Maxwell's equations.

Under the equality constraint of n'=n the boundaries y=0,Y using the piecewise taper functions, the δr and δθ functions themselves have no special boundary conditions. We also explored using sine series in the y direction to impose Dirichlet boundary conditions at the end facets.

The deformations were expanded in Chebychev polynomials. The grid was 5×6, which is also the number of terms of the expansion needed for the series. The benefit of expanding in a series is that the interpolation can be done for computing anisotropy at 20 times the number of grid points (for a total of about 8000), while only keeping 30 degrees of freedom so that the optimization is fast.

For interpolation we start with a 5×6 grid of points in the untransformed straight wave guide. Each point is an (x, y) pair. There are two degrees of freedom for each point: and δθ, for a total of 60 degrees of freedom. These are the optimization parameters that can be varied.

For higher resolution, we first interpolate when computing the constraints, i.e. $1.6 < n' < 3.2$ and the objective function M. These are the values needed to update the symplex when optimizing using COBYLA. Both directions use Chebychev polynomials with the same number of coefficients as the number of degrees of freedom. We assume the functions must be slowly varying, so only a few Chebychev terms are needed. Also, $\mathcal{J}$ the needs to be slowly varying, because we assumed $\mu' = \mathcal{J}\mathcal{J}^T / \det \mathcal{J}$ can be commuted with the curl in Maxwell's equations.

The anisotropy M is a complicated function of our optimization degrees of freedom that must be calculated. To minimize it we make up a dummy variable and then tie it to the true anisotropy using an inequality constraint:

$$(\mathcal{M}(x,y) - \mathcal{M}_{obj})\alpha_M < 0$$

$$\mathcal{M}(x,y) \equiv \left(\frac{tr\mathcal{J}\mathcal{J}^T}{\det \mathcal{J}}\right)^2 - 4$$

This constraint is not followed exactly all the time, especially near the very beginning when the actual anisotropy might not be in the feasible space defined by our initial $M_{obj}$. Depending on the choice of these two parameters at the very beginning, the optimization may take very different trajectories in the parameter space. Setting $M_{(x,y)} = M_{obj}$ at the beginning does not give the best results. The reason for this is not very well understood. We have tested our optimization for different bend radii as well. We expect the anisotropy that the anisotropy should go as 1/R by simple dimensional analysis arguments, but that is not the case as seen in the figure.

Many other variations on these procedures could be used. A wide variety of nonlinear optimization algorithms have been developed that could be applied to this problem, including gradient-based algorithms (such as SQP or MMA), global optimization algorithms (such as multistart algorithms or genetic algorithms), and so on. Although we found spectral representation of the unknowns, in terms of Fourier series or Chebyshev polynomials, to be very effective, one could use many other function representations and interpolation schemes such as finite elements or splines.

Various representations of the "transition regions" from the bend to the endfacets could be used, such as polynomials or sinusoids, and one could also impose the endfacet constraints directly as nonlinear constraints in the optimization rather than implicitly in the representation of the transformation function. Instead of minimizing anisotropy for a fixed bend radius, one could minimize bend radius for a given anisotropy, and more generally one could optimize other objectives such as mode squeezing/expanding, minimizing optical path length, or maximizing optical path length (e.g. for nonlinear devices where one wishes to obtain a long path length in a small fabrication volume by combining many waveguide bends).

One could rapidly estimate the intermodal scattering using perturbative techniques such as coupled mode theory (also known as coupled-wave theory) or Born approximations, and minimize or constrain the scattering rather than the anisotropy. If fabrication techniques are able to incorporate anisotropy (e.g. by anisotropic metamaterials such as anisotropic subwavelength grooves, corrugations, or other patterns), then the optimization could easily be altered to allow prescribed anisotropy. The possibility of random manufacturing variations could be included in the optimization in order to maximize robustness.

Figure 6:
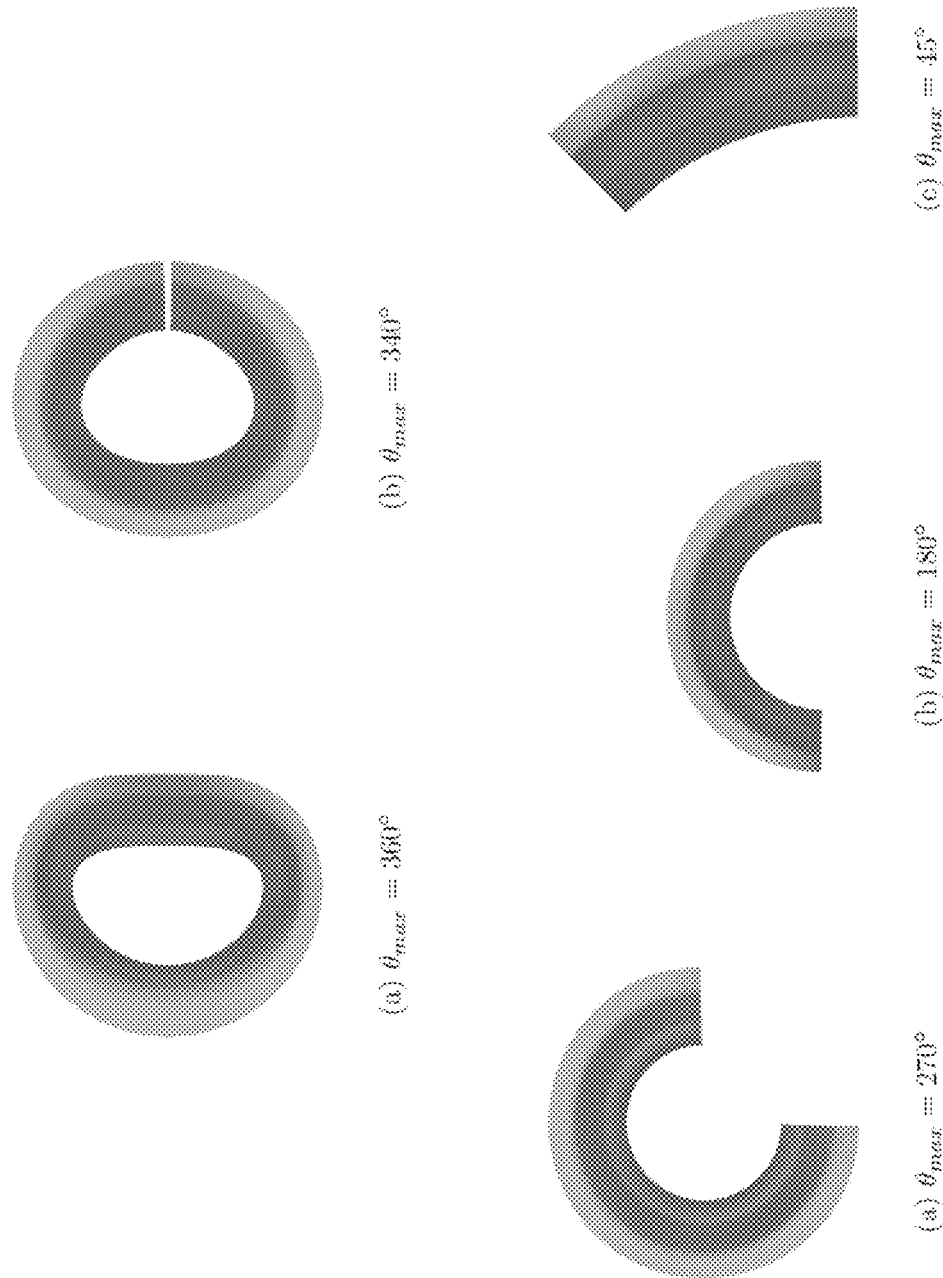
FIG. 6 shows examples of different multi-mode waveguide bends based on the disclosed transformation design: (a) a closed multimode waveguide loop, (b) an open multimode waveguide loop with a gap, (c) an open multimode waveguide arc, (d) a half circle bend multimode waveguide, and (d) a 45-degree bend waveguide section.

FIG. 6 shows examples of different multi-mode waveguide bends based on the disclosed transformation design: (a) a closed multimode waveguide loop, (b) an open multimode waveguide loop with a gap, (c) an open multimode waveguide arc, (d) a half circle bend multimode waveguide, and (d) a 45-degree bend waveguide section.

Figure 7A:
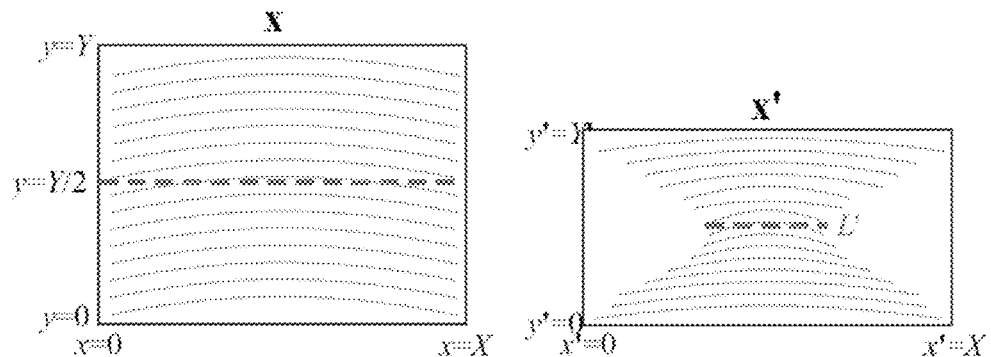
FIG. 7A shows an example of a focusing or squeezer structure design based on the coordinate transformation: in the transformed x' coordinates, space is compressed in the center so that a wave incident on [0,X] is focused to a length L'.
Figure 7B:
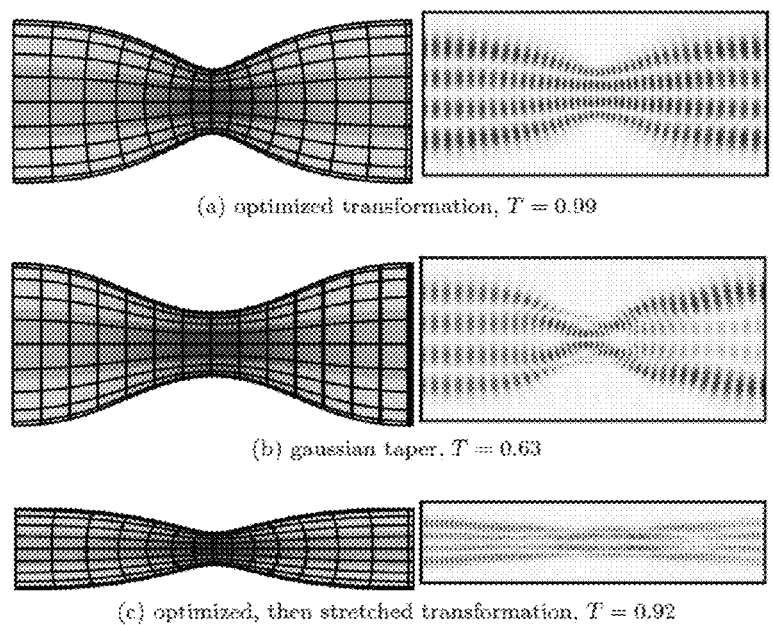
FIG. 7B shows simulation examples of an optimized squeezer (a), a Gaussian width squeezer (b), and an optimized squeezer stretched to twice the original length (c).

FIG. 7A shows an example of a focusing or squeezer structure design based on the coordinate transformation: in the transformed x coordinates, space is compressed in the center so that a wave incident on [0,X] is focused to a length L'. FIG. 7B shows simulation examples of an optimized squeezer (a), a Gaussian width squeezer (b), and an optimized squeezer stretched to twice the original length (c).

The above focusing device is for a transformation volume $V = [0,X] \times [0,Y]$. A wave in the untransformed medium is incident at y=0 in a region $x \in [0,X]$, propagating in the y direction. In the transformed (x') system, we map the $y=Y/2$ line segment for $x \in [0,X]$ to a narrower line of length L', and the corresponding wave solution is compressed by a factor L'/X. By the time y'=Y', the wave has "uncompressed" and has resumed with its original width to continue propagating unimpeded. The idea is that, if L' is small enough, one may be able to do some interesting nonlinear optics or other devices in the focused region of the transformed system. Moreover, because it stems from transformational optics, this transformation should work no matter how multimode the propagation is, and will transform all modes while preserving relative phase etcetera, just as if they were propagating in the untransformed region.

The boundary conditions of the transformation are $$x'(x,0) = x'(x,Y) = x, \ y'(x,0) = 0, \ y'(x,Y) = Y.$$

The length L' of the focusing region is given by $$L' = \int_0^X \sqrt{\left(\frac{\partial x'}{\partial x}\right)^2 + \left(\frac{\partial y'}{\partial x}\right)^2}\bigg|_{y=\frac{Y}{2}} dx.$$

Within these boundary conditions, the question is then: what is the transformation that minimizes L' while also keeping sufficiently small so as to be approximately isotropic? Most likely one also has other constraints as well, e.g. bounds on the minimum and maximum attainable index n.

Figure 8A:
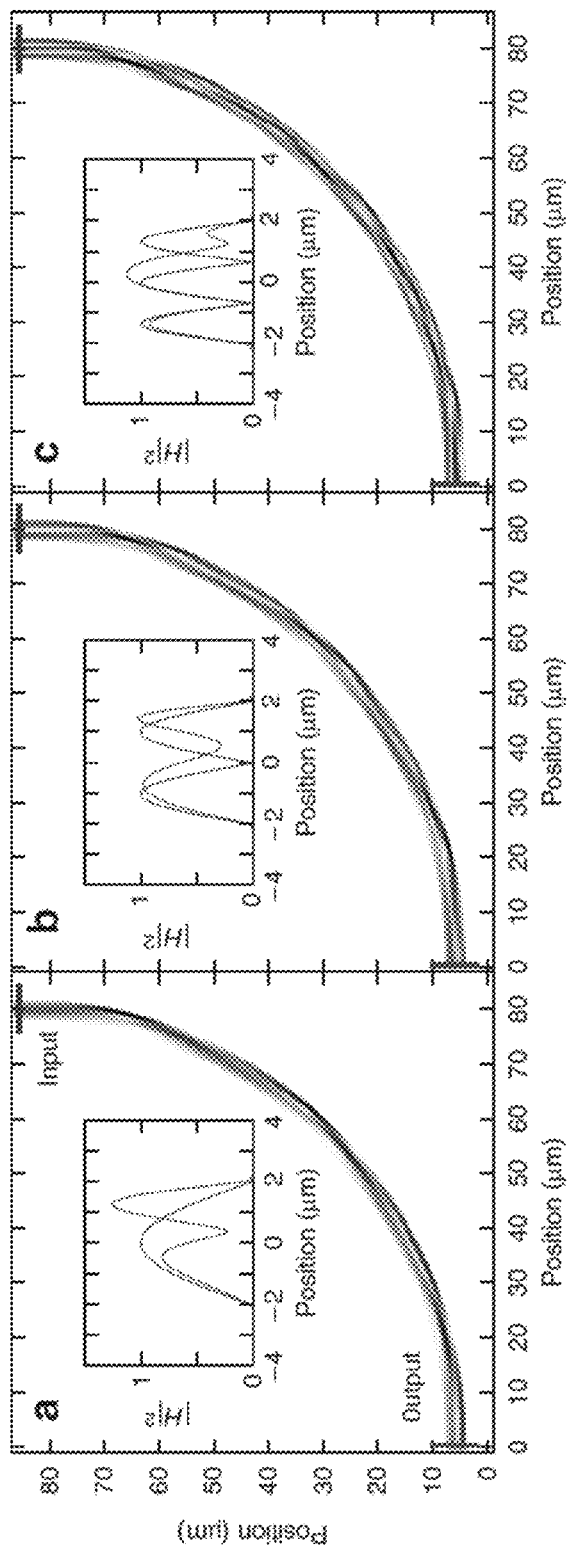
FIG. 8A shows simulation results of the magnetic field magnitude squared (|H|2) for a conventional multimode bend when excited with the first three modes of the input multimode waveguide (a-c, respectively). The input modes (blue cross-sections, on the upper right endpoints) are coupled to many other modes, as evidenced by the cross-section plots at the outputs (red, on the lower left endpoints). The waveguides are 4 mm wide and the bends have 78.8 mm radius.
Figure 8B:
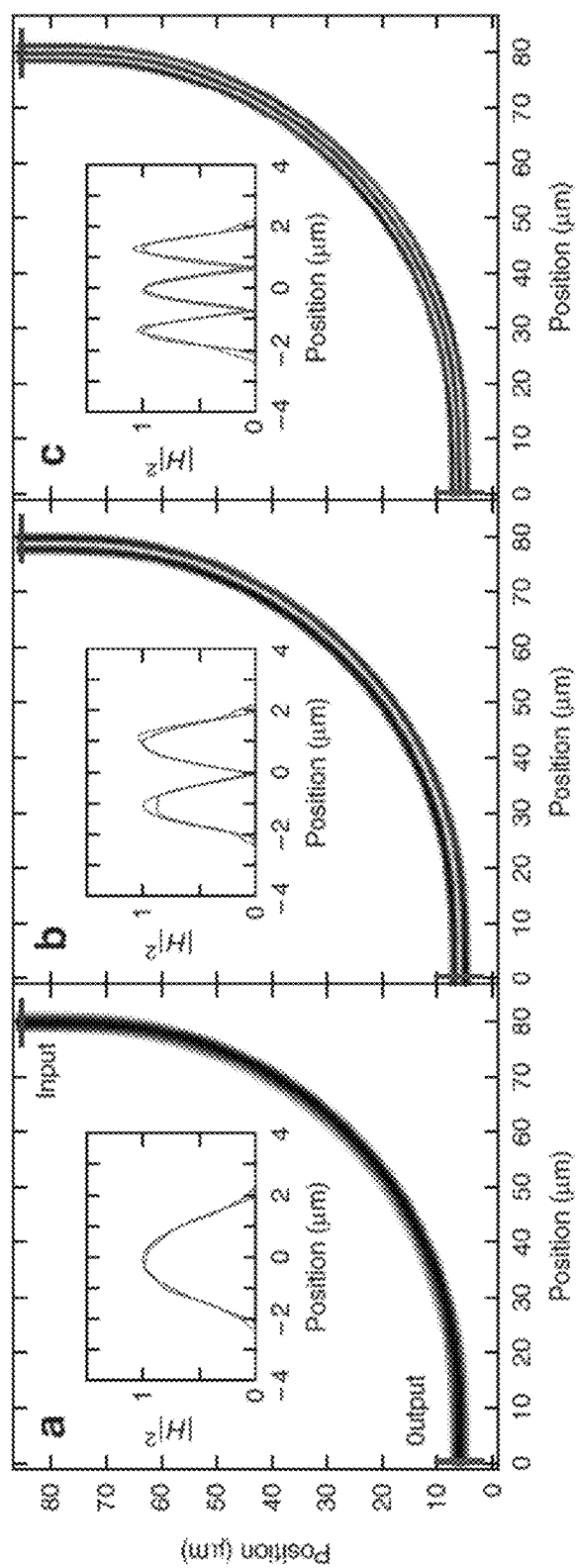
FIG. 8B shows simulation results of the magnetic field magnitude squared (|H|2) for a bend multimode waveguide section based on the current design when the bend is excited with the first three modes of the input multimode waveguide (a-c, respectively). The input modes (blue cross-sections, on the upper-right endpoints) are preserved throughout the bends, showing minimal inter-mode coupling at the outputs (red, on the lower left endpoints). The waveguides are 4 mm wide and the bends have 78.8 mm radius.

FIGS. 8A and 8B show modal crosstalk in multimode waveguides. The modal superposition excited in multimode bends is exemplified in FIG. 8A, where we show the field distribution of a 4-μm wide waveguide (supporting 16 modes) excited by the fundamental mode at λ=1.55 μm and bent with 78.8 μm radius. One can see that the bending of the waveguide leads to a superposition of many higher modes at the output, which in turn introduce penalties to the bandwidth of this channel. In the 4-μm waveguide shown in FIG. 8A, the limit in bandwidth-distance product that can be supported only due to difference in group velocities between the fundamental and second-order mode is below 16 Gb m s$^{-1}$ (for complete symbol overlap), between the fundamental and third order mode is Gb m s$^{-1}$, and so on. Therefore, any device that couples a significant amount of power into these modes, such as the circular bend simulated here (71% of the power input in the fundamental mode is coupled to the second-order mode and 23% to the third), will severely limit the communication data rate of the system. One way to minimize the mode mixing would be to use very large bending radii. For the 4-μm waveguide, to ensure that 95% of power is coupled back to the fundamental mode of the straight waveguide, a bending radius of more than 1 mm is necessary, which is unacceptably large for photonics integration.

Multimode bend design via transformation optics (TO). There are two main challenges in designing a waveguide bend via TO in a silicon photonics platform, in contrast to arbitrary metamaterials. The first design challenge is the need to employ only isotropic materials with refractive indices limited to values between the index of Si and the index of $SiO_2$ (roughly $1.5<n<3.5$). Although in principle anisotropic materials, such as SiC, can be used in silicon photonics, TO requires in general a gradient anisotropy, which is much more complex to achieve. Note that one could also use photonic crystals or grooves to tailor the index and anisotropy, however these discrete structures result in additional field scattering and inter-mode coupling due to the finite wavelength/period ratio (typically around 10:1). Instead, we use a grayscale-lithography technique described below that produces smooth gradients but is limited to mostly isotropic effective indices. The second design challenge is to match the refractive index and the geometry of the device at its endfacets to the multimode waveguides connected to it. If the connection is not matched, each mode from the straight waveguide will couple to many modes in the bend, similar to the case of a conventional bend (FIG. 8A), immediately introducing inter-mode coupling, even if the bend itself does not. This means that the bend transformation must smoothly transition from the same shape of the input waveguides at its endfacets to the required curve in its interior.

To address these two design challenges, we developed a general optimization method for TO design of the profile and dimensions of the multimode devices for minimal intermodal mixing, while accounting for limited index contrast and anisotropy, and at the same time ensuring minimal reflections at the interfaces. We optimize the design of the structure over a large space of possible smooth transformations, parameterized by general Fourier/Chebyshev series coefficients, to find the transformation with minimal worst-point anisotropy that satisfies the refractive index constraints (see Methods). At the same time, we match the geometry and index of the bend endfacets to the adjacent multimode waveguide—the transformation is parameterized in such a way as to satisfy this boundary condition by construction. Note that previous quasiconformal maps proposed to minimize transformation anisotropy, do not incorporate the index constraints, minimize only the average anisotropy and require the entire boundary curves of the bend shape to be specified a priori instead of just the endfacet locations.

The optimized multimode bend obtained has an effective radius of curvature of 19.7 times the width of the waveguide. Using a 4-μm wide waveguide then results in a radius of 78.8 μm, which we also used in the simulations of FIG. 8A for comparison. In FIG. 8B, we show the first three propagating modes of the input waveguide travelling almost undisturbed through the optimized bend. The optimized bend's effective-index profile can be seen in FIG. 9.

Figure 9:
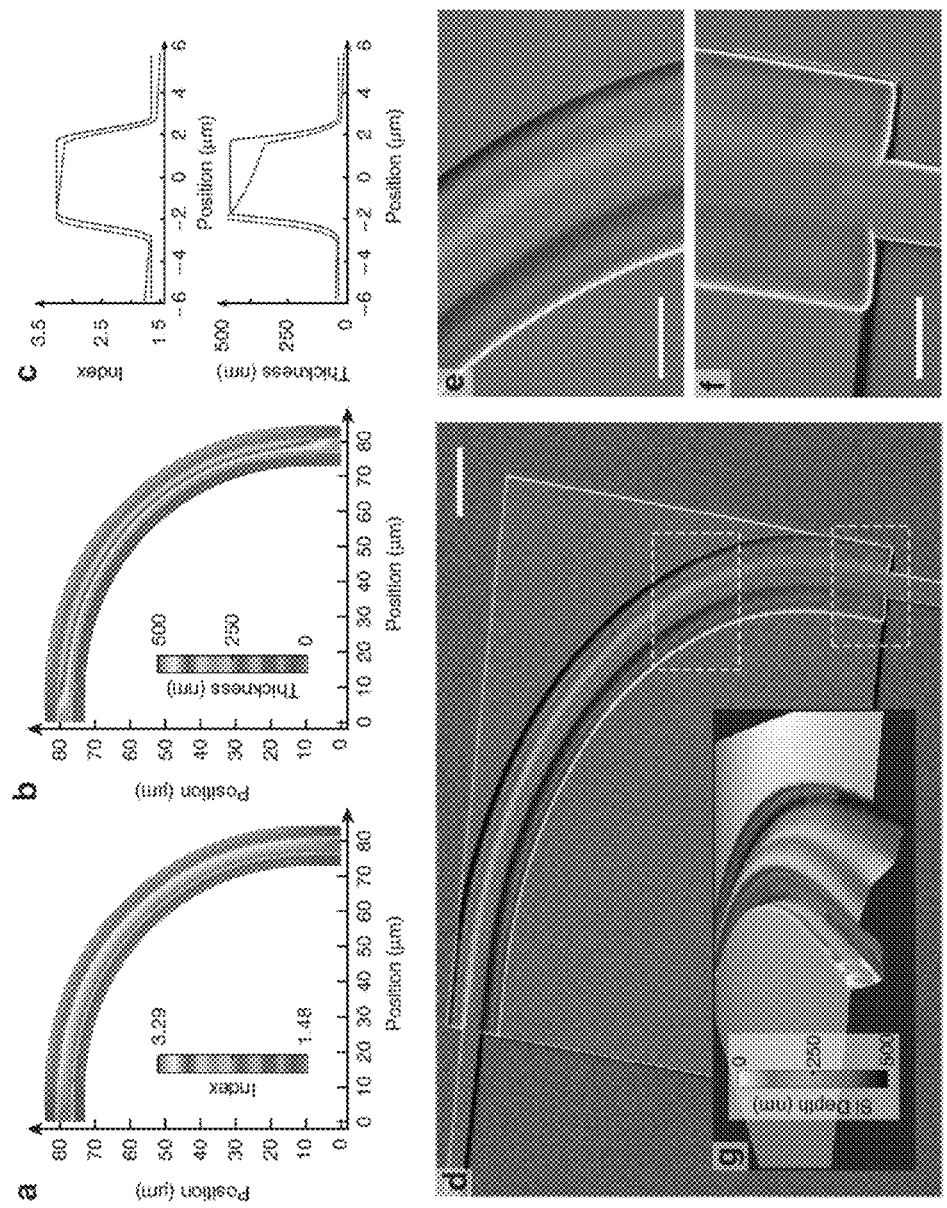
FIG. 9 shows an example of a 90-degree bend waveguide section formed on a silicon-on-insulator wafer with a graded-index by using grayscale e-beam lithography. Optimized refractive index profile (a) for the multimode bend and respective silicon layer thickness (b) to implement the bend. (c) Cross-sections of the refractive index and thickness of the profiles at the endpoints (blue) and at the centre of the bend (red). (d) Scanning electron microscope images of the fabricated graded-index bend (10 mm scale). The smoothness obtained by our grayscale process can be seen in panel e, the close-ups of the bend interior (5 mm scale), and panel f, the connection with a conventional multimode waveguide at the output (4 mm scale). (g) Atomic force microscope scan of a fabricated bend, showing the thickness profile in the silicon layer.

The fabrication of a graded-index device was demonstrated and is shown in FIG. 9. The multimode bend is achieved using grayscale e-beam lithography, on a silicon-on-insulator wafer with 3 μm buried $SiO_2$ and 500 nm Si layer. We create the required non-uniform refractive index medium using the effective propagation index for our vertical slab structure, composed by the buried $SiO_2$ layer, the guiding Si layer and a cladding layer of $SiO_2$ deposited via plasma-enhanced chemical vapour deposition. The effective propagation index of this structure is controlled by the thickness of the Si layer, such that the index map from the TO optimization (FIG. 9a) is translated into a thickness map to be fabricated via grayscale lithography (FIG. 9b). The grayscale lithography is achieved via dose modulation for patterning the photonic device with vertical resolution of ≈10 nm. Note that although similar processes are employed in the fabrication of diffractive optical elements, micro-electro-mechanical structures and lower contrast gradedindex lenses with relatively weak height variations of 80 nm over distances of tens of microns, in our case, the process enables strong height variations of 400 nm over less than 1 mm while maintaining precise control of both the resist height profile on the nanometre scale. FIG. 3 shows the grayscale patterned device with a smooth surface profile in Si.

Figure 10A:
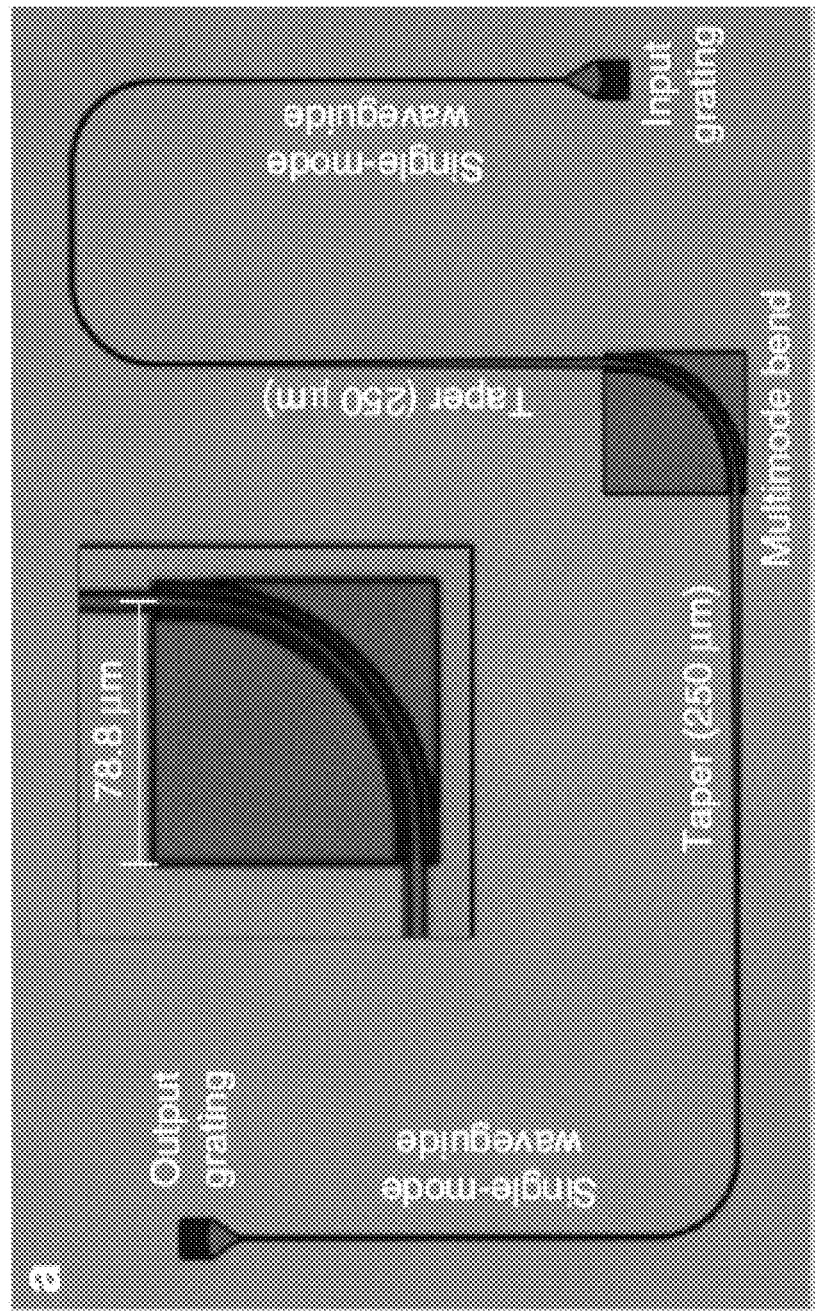
FIGS. 10A and 10B show (a) an optical microscope image of a tested device having a 90-degree bend multimode waveguide section, interconnecting tapered waveguides and input/output single-mode waveguides. The large length of the tapers is set to ensure that only the fundamental mode is excited at the multimode bend input and, conversely, higher-order modes excited along the bend are radiated by the output taper. As such, the power measured at the output grating reflects how well the fundamental mode is preserved by the bend. (b) Histograms of the measurements from our multimode bend design (blue) and a conventional multimode bend with rectangular cross-section (red) with same radius. There is a 14.6-dB improvement in the average transmission coefficient for the fundamental mode of the optimized bend with respect to the conventional one.

To evaluate the performance of our mode-preserving multimode bend, we compare it with a circular multimode bend with rectangular profile and with same radius as our device (78.8 μm). We measure the transmission coefficient of the fundamental mode through the bend, so that the presence of inter-mode coupling is evidenced by low transmitted power in the system. To ensure we are exciting and collecting only the fundamental waveguide mode, we couple light into our sample via a grating connected to a single-mode waveguide, which, in turn, tapers very slowly (over 250 μm) to a 4-μm wide multimode waveguide. This waveguide connects to the bend and the output is once again slowly tapered down to a single-mode waveguide, radiating away any higher-order modes that might have been excited along the bend. Light from the single-mode waveguide is coupled via another grating to a fibre, which in turn is connected to detector and a power meter. An optical microscope image of this system is shown in FIG. 10a. The results are displayed in the plots of FIG. 10b, where we show the histograms for measurements of 25 devices designed via TO and 11 conventional multimode bends.

Figure 10B:
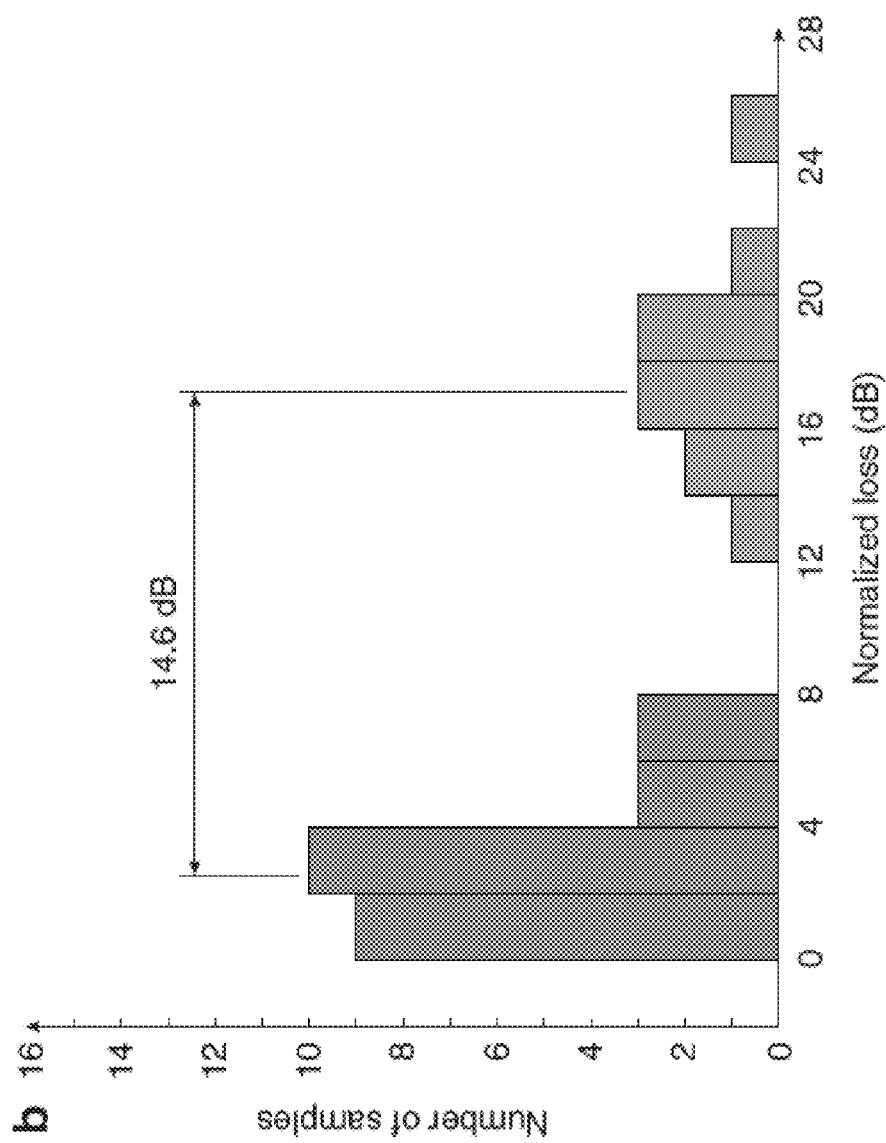

The data presented in FIG. 10b clearly show the vast improvement in transmission from our TO multimode bends with respect to the conventional ones, a direct result of the mode-preserving characteristic of our design. Moreover, the two-dimensional (2D) simulations show a difference in transmission for the fundamental mode of 13.6 dB, closely agreeing with the experimental results.

It is also important to analyse the performance of our multimode bend against a conventional single-mode one to evaluate how much the grayscale fabrication impacts in the total losses in the link. Measurements of 11 single-mode waveguide bends on the same sample showed an averaged normalized transmission coefficient of −2.6 dB, very similar to our TO design (−2.5 dB). These numbers enforce our conclusions of minimal inter-mode coupling in the optimized bend and indicate that any additional losses introduced in the grayscale process are compensated by the naturally lower losses found in multimode waveguides (due to less interaction of the fields with the core interfaces). We note that the variations in the transmission seen in the measurements of the TO bend are observed in the singlemode devices as well, indicating that the variations are due to fabrication steps common to all devices, which might have introduced impurities in the sample, and not from the grayscale process itself.

Thus, we demonstrate an optimized design and fabrication process for a multimode photonic platform with very low intermode coupling. This platform can be used to enable multimode photonics while also pointing towards the possibility of developments in mode multiplexing[26-30] for ultra-high bandwidth communications.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for designing a multimode waveguide device, comprising:
   providing an initial virtual multimode waveguide structure that supports different optical modes and is structured to have desired optical properties and behavior in guiding the different optical modes;
   providing a transformation function representing optical properties of a target multimode waveguide structure that is different in structure from the initial virtual multimode waveguide structure and that is to be designed to substantially retain the desired optical properties and behavior of the initial virtual multimode waveguide in guiding the different optical modes in the target multimode waveguide structure;
   adjusting a geometry, a dimension or an effective refractive index of the target multimode waveguide structure, thus changing the transformation function, to modify the target multimode waveguide structure while substantially retaining the desired optical properties and behavior of the initial virtual multimode waveguide in guiding the different optical modes in the target multimode waveguide structure; and
   continuing to adjust a geometry, a dimension or an effective refractive index of the target multimode waveguide structure to optimize the transformation function to achieve an optimized target multimode waveguide structure which has a desired structure different from the initial virtual multimode waveguide structure and which substantially retains the desired optical properties and behavior of the initial virtual multimode waveguide in guiding the different optical modes in the optimized target multimode waveguide structure.

2. The method as in claim 1, wherein:
   the initial virtual multimode waveguide structure represents a virtual straight multimode waveguide structure in which the different optical modes are independent of one another with a reduced cross-talk between the different optical modes; and
   the optimized target multimode waveguide structure is a bend multimode waveguide structure that has a spatially varying bend profile and a spatially varying effective index of refraction to maintain the different optical modes to be independent of one another with a reduced cross-talk between the different optical modes.

3. The method as in claim 1, wherein:
   the initial virtual multimode waveguide structure causes the different optical modes to mix to produce a desired amount of cross-talk between the different optical modes; and
   the optimized target multimode waveguide structure is a bend multimode waveguide structure that has a spatially varying bend profile and a spatially varying effective index of refraction to maintain the desired amount of cross-talk between the different optical modes of the initial virtual multimode waveguide structure.

4. The method as in claim 1, comprising:
   configuring the optimized target multimode waveguide structure to cause light in the different optical modes to maintain a phase-matching relation.

5. The method as in claim 1, configuring:
   configuring the optimized target multimode waveguide structure to include a narrow waist section at which the light is spatially squeezed.

6. The method as in claim 1, configuring:
   configuring the optimized target multimode waveguide structure to include an expanded section at which the light is spatially expanded.

7. The method as in claim 1, configuring:
   configuring the optimized target multimode waveguide structure to be an optical modulator.

8. The method as in claim 1, configuring:
   configuring the optimized target multimode waveguide structure to be an optical interferometer.

9. The method as in claim 1, configuring:
   configuring the optimized target multimode waveguide structure to be an optically nonlinear device.

10. A method for designing an optical waveguide that supports different optical modes to have a controlled coupling between optical modes, comprising:
    providing an optical waveguide to include an input waveguide section that receive light in the different optical modes, a bend waveguide section connected to the input waveguide section to receive and carry the light, and an output waveguide section connected to the bend waveguide section to output the light received from the bent waveguide section;
    providing a first mode transformation function representing impact to the optical modes by the input waveguide section, a second mode transformation function representing impact to the optical modes by the bend waveguide section and a third mode transformation function representing impact to the optical modes by the output waveguide section; and
    adjusting geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section to produce a spatially varying structure and a spatially varying refractive index in the bend waveguide section to produce controlled coupling of light in the different optical modes.

11. The method as in claim 10, wherein, the adjusting of the geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section includes:

configuring the bend waveguide section to have a spatially varying bend profile and a spatially varying effective index of refraction from a first end coupled to the input waveguide section to a second end coupled to the output waveguide section to cause light in the different optical modes to remain independent of one another with a reduced cross-talk between the different optical modes.

12. The method as in claim 11, wherein, the adjusting of the geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section further includes:

configuring the bend waveguide section to cause light in the different optical modes to maintain a phase-matching relation when propagating through the bend waveguide section.

13. The method as in claim 10, wherein, the adjusting of the geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section includes:

configuring the bend waveguide section to have a spatially varying bend profile and a spatially varying effective index of refraction from a first end coupled to the input waveguide section to a second end coupled to the output waveguide section to achieve a desired cross-talk between the different optical modes.

14. The method as in claim 13, wherein, the adjusting of the geometries, dimensions and refractive indices associated with the input waveguide section, the bend waveguide section and the output waveguide section to optimize the first, second and third mode transformation functions and boundary conditions at boundaries of the input waveguide section, the bend waveguide section and the output waveguide section further includes:

configuring the bend waveguide section to cause light in the different optical modes to maintain a phase-matching relation when propagating through the bend waveguide section.

\* \* \* \* \*